J. THIRY.
FRICTION COUPLING WITH EXPANDING LOCKING MEMBER.
APPLICATION FILED DEC. 28, 1909.

970,573.

Patented Sept. 20, 1910.

Witnesses:

Inventor:

UNITED STATES PATENT OFFICE.

JULES THIRY, OF ST. SERVAIS-NAMUR, BELGIUM.

FRICTION-COUPLING WITH EXPANDING LOCKING MEMBER.

970,573.   Specification of Letters Patent.   Patented Sept. 20, 1910.

Application filed December 28, 1909. Serial No. 535,283.

*To all whom it may concern:*

Be it known that I, JULES THIRY, a subject of Belgium, and resident of St. Servais-Namur, Belgium, have invented a new Friction-Coupling with Expanding Locking Member, of which the following is a specification.

This invention relates to a friction coupling with expanding inner locking-member in which the throwing into gear of both shafts is provoked by increasing the circumference of the inner locking-member by means of the rotation of a shaft inversely threaded at both ends and engaging nuts forming one body with the extremities of the inner locking-member.

My invention relates more particularly to the means for maintaining the two coupling-members in the coupled or in the uncoupled position by providing a device which secures the screw-threaded shaft as soon as it is brought from the one of its extreme positions into the other.

Figure 1:
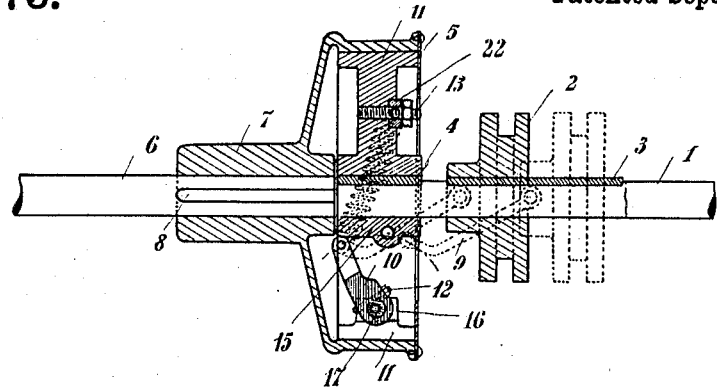
Figure 2:
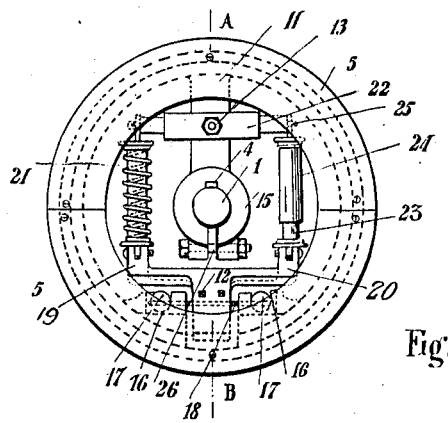
Figure 3:
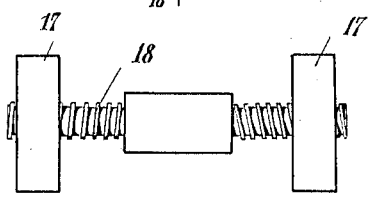
Figure 4:

I attain these objects by the mechanism illustrated in the accompanying drawing, in which:

Figure 1 is a longitudinal section of the coupling on the line A—B of Fig. 2. Fig. 2 a front view of the coupling without the gearing sleeve 2. Fig. 3 a detail view of the screw-threaded shaft and nuts destined to actuate the inner locking member, and Fig. 4 a cross section of the nut with circular section.

Similar letters refer to similar parts throughout the several views.

The hollow pulley 7 secured on the countershaft 6 by means of the key 8 constitutes the outer locking member of the coupling. The inner locking-member 11 secured on the shaft 1 by means of the key 4 and the screw and bolt 26 can rotate freely inside of the pulley 7 and has the shape of an annular segment; it is provided at both ends with U shaped grooves 16 destined to receive the nuts 17 of circular section; these nuts are screwed on the shaft 18 which is inversely threaded at its extremities. A fork-shaped lever 10 is secured in the middle of said shaft by means of the pins 12.

The fork shaped lever 10 is acted upon at its extremities 19 and 20 (Fig. 2) by two strong spiral springs 21 which are supported at their upper ends by a cross member 22 acting as a support which member is fixed to the inner locking member by a bolt 13. Each spring is guided by a rod 23 sliding in a hollow member 24 fixed to the projections 25 of the cross member 22. The ends 19 and 20 of the fork shaped lever 10 are connected by means of rods 9 to the sleeve 2 sliding on shaft 1 and key 3 and actuated by means of a lever. The sliding motion of this sleeve is limited by means of a ring secured on shaft 1. Both ring and lever are not indicated on the drawing.

When the sliding sleeve 2 is brought from the right to the left, *i. e.* in the drawing from the position indicated in dotted lines in that indicated in full lines, the rods 9 act on the extremities 19 and 20 of the fork shaped lever 10 which are brought from the right to the left; the lever 10 being secured to the threaded shaft 18 the latter rotates partially and acts on the nuts 17 thus expanding the inner locking member. As soon as lever 10 is beyond its dead point in the one or the other direction the springs 21 act on the ends 19 and 20 of said lever, thus bringing and maintaining it in one of its extreme positions. The action of the springs 21 can be regulated by retaining the driving lever more or less while said springs are working.

A sheet-iron plate 5, in two parts, is screwed onto the outer locking member 7 of the coupling and is destined to protect its mechanism.

Now what I do claim as my invention and desire to secure by Letters Patent is:

A friction coupling comprising an annular-shaped outer locking member, inside of said outer locking-member an expanding inner locking member whose shape is that of an annular segment, a shaft inversely threaded at its extremities and engaging nuts lodged in grooves provided at the ends of the inner locking member, a fork shaped lever secured in the middle of said shaft, lateral and appropriately guided springs interposed between said fork-shaped lever and the expanding locking member and secured at one end to the extremities of the fork-shaped lever and at the other end to a cross-bar screwed onto the inner locking-member, and connecting-rods hinged at one end to the extremities of said fork-shaped lever and at the other end to a shifting-sleeve slidably arranged on the driving shaft, all substantially as described.

JULES THIRY.

Witnesses:
GREGORY PHELAN,
M. GERBEAULT.